United States Patent
Matsumoto et al.

(10) Patent No.: US 8,755,147 B2
(45) Date of Patent: Jun. 17, 2014

(54) MAGNETIC HEAD POLE INCLUDING LAMINATED STRUCTURE HAVING MAGNETIC AND NONMAGNETIC LAYERS

(71) Applicant: Kabushiki Kaisha Toshiba, Tokyo (JP)

(72) Inventors: Takuya Matsumoto, Ome (JP); Kenichiro Yamada, Tokyo (JP); Masayuki Takagishi, Kunitachi (JP); Katsuhiko Koui, Yokohama (JP); Hitoshi Iwasaki, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 14/019,110

(22) Filed: Sep. 5, 2013

(65) Prior Publication Data
US 2014/0002926 A1 Jan. 2, 2014

Related U.S. Application Data

(63) Continuation of application No. 13/295,866, filed on Nov. 14, 2011, now abandoned.

(30) Foreign Application Priority Data

Apr. 15, 2011 (JP) ................. 2011-091447

(51) Int. Cl.
*G11B 5/127* (2006.01)
(52) U.S. Cl.
USPC ........................................ 360/99.08
(58) Field of Classification Search
USPC .......... 360/99.08, 99.18, 99.12, 97.19, 97.13, 360/97.14, 97.15
See application file for complete search history.

(56) References Cited

U.S. PATENT DOCUMENTS

| | | |
|---|---|---|
| 7,957,098 B2 | 6/2011 | Yamada et al. |
| 2007/0097546 A1 | 5/2007 | Li et al. |
| 2008/0268291 A1 | 10/2008 | Akiyama et al. |
| 2008/0304176 A1 | 12/2008 | Takagishi et al. |
| 2009/0021868 A1 | 1/2009 | Takano et al. |
| 2009/0052095 A1 | 2/2009 | Yamada et al. |
| 2009/0225465 A1 | 9/2009 | Iwasaki et al. |
| 2009/0257151 A1 | 10/2009 | Zhang et al. |
| 2010/0195247 A1 | 8/2010 | Mochizuki et al. |
| 2010/0220415 A1 | 9/2010 | Yamada et al. |
| 2012/0262820 A1 | 10/2012 | Matsumoto et al. |
| 2012/0262821 A1* | 10/2012 | Taguchi et al. ............ 360/99.08 |
| 2013/0148242 A1* | 6/2013 | Koui et al. ............... 360/125.12 |
| 2013/0250456 A1* | 9/2013 | Yamada et al. ............ 360/245.3 |
| 2013/0271869 A1* | 10/2013 | Taguchi et al. ............ 360/99.08 |

FOREIGN PATENT DOCUMENTS

| | | |
|---|---|---|
| JP | 2009-026449 | 2/2009 |
| JP | 2009-070541 | 4/2009 |
| JP | 2010-182361 | 8/2010 |

* cited by examiner

*Primary Examiner* — Allen T Cao
(74) *Attorney, Agent, or Firm* — Knobbe, Martens, Olson & Bear LLP

(57) ABSTRACT

According to one embodiment, a magnetic head includes a main pole configured to apply a recording magnetic field to a recording layer of a recording medium, a return pole opposed to the main pole with a write gap therebetween, and a high-frequency oscillator between respective facing surfaces of the main pole and the return pole and configured to produce a high-frequency magnetic field. At least one of the main and return poles faces the high-frequency oscillator and includes a laminated structure portion includes a magnetic layer and a nonmagnetic layer laminated to one another.

18 Claims, 8 Drawing Sheets

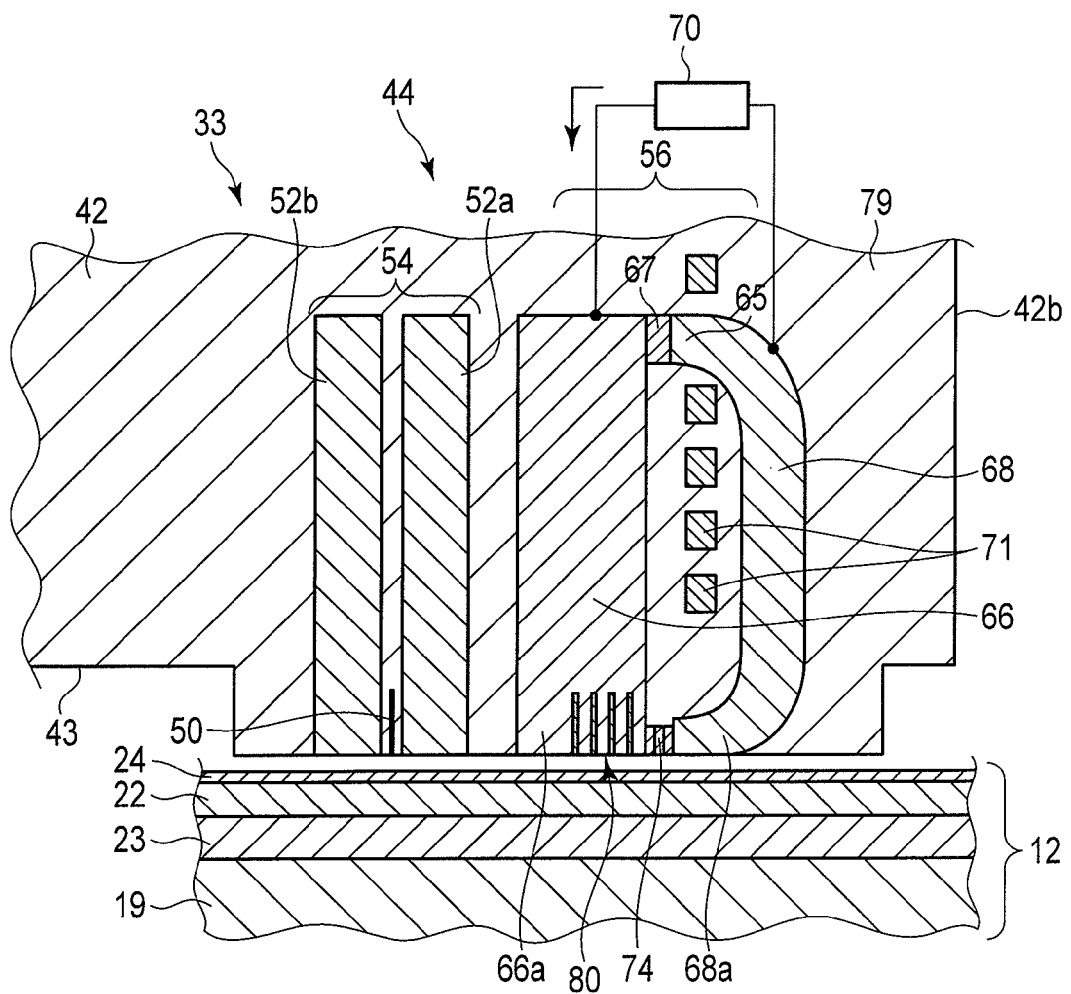
F I G. 3

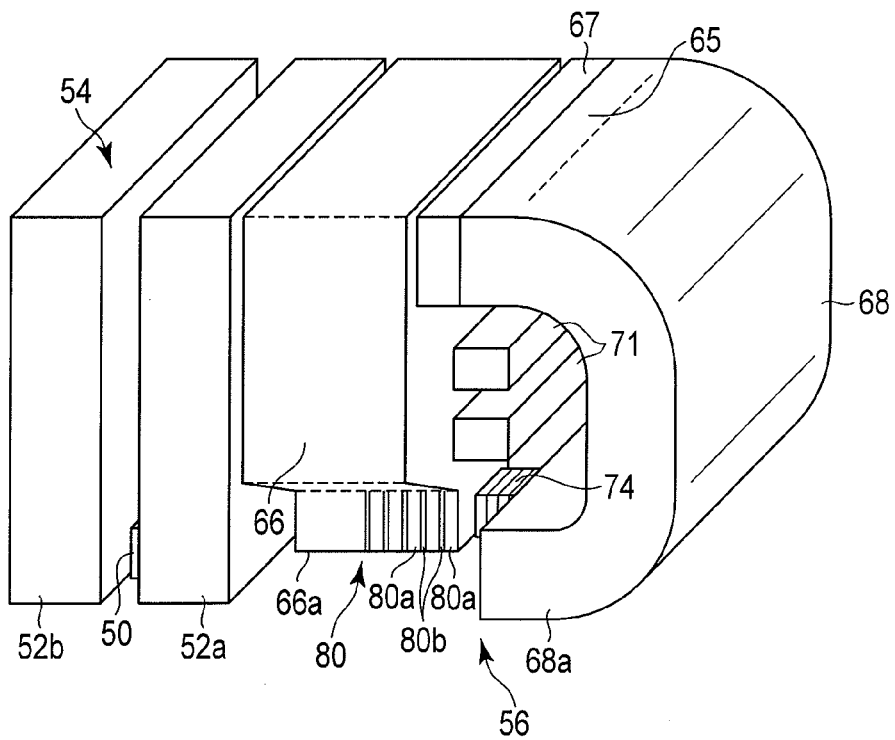
F I G. 4
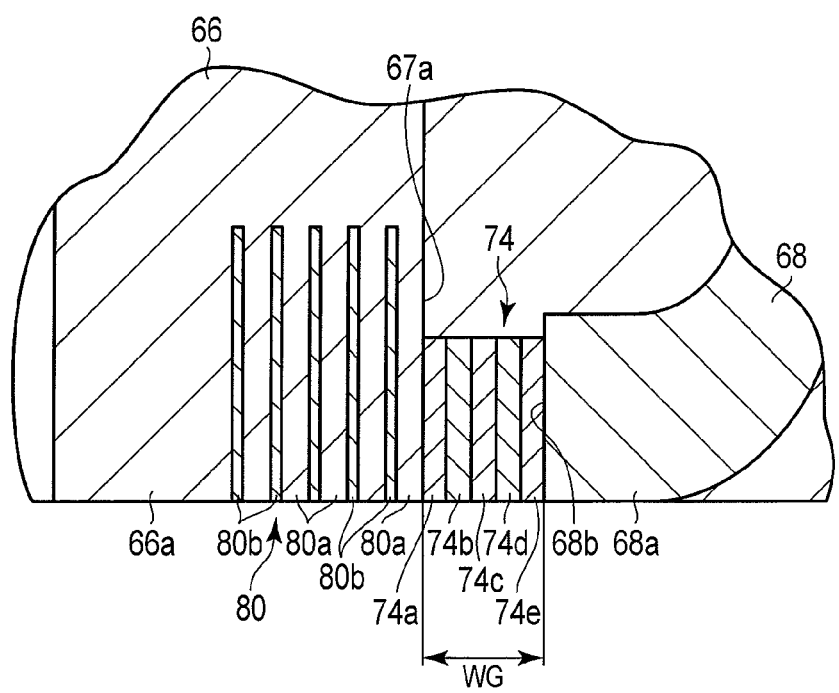
F I G. 5

MAGNETIC HEAD POLE INCLUDING LAMINATED STRUCTURE HAVING MAGNETIC AND NONMAGNETIC LAYERS

CROSS-REFERENCE TO RELATED APPLICATIONS

This application is a continuation of U.S. patent application Ser. No. 13/295,866, filed on Nov. 14, 2011, which is based upon and claims the benefit of priority from prior Japanese Patent Application No. 2011-091447, filed Apr. 15, 2011; the entire contents of these applications are incorporated herein by reference.

FIELD

Embodiments described herein relate generally to a magnetic head for perpendicular magnetic recording used in a disk drive, a head gimbal assembly provided with the same, and the disk drive.

BACKGROUND

A disk drive, such as a magnetic disk drive, comprises a magnetic disk, spindle motor, magnetic head, and carriage assembly. The magnetic disk is disposed in a case. The spindle motor supports and rotates the disk. The magnetic head reads data from and writes data to the disk. The carriage assembly supports the head for movement relative to the disk. A head section of the magnetic head comprises a recording head for writing and a reproduction head for reading.

Magnetic heads for perpendicular magnetic recording have recently been proposed in order to increase the recording density and capacity of a magnetic disk drive or reduce its size. In one such magnetic head, a recording head comprises a main pole configured to produce a perpendicular magnetic field, return or write/shield pole, and coil. The return pole is located on the trailing side of the main pole with a write gap therebetween and configured to close a magnetic path that leads to a magnetic disk. The coil serves to pass magnetic flux through the main pole.

To improve the recording density, a magnetic head based on high-frequency magnetic field assist recording is proposed in which a spin-torque oscillator for use as a high-frequency oscillation element is disposed between main and return poles. A high-frequency magnetic field is applied from the spin-torque oscillator to a magnetic recording layer. This magnetic head is configured so that the distance between the respective facing surfaces of the main and return poles is reduced to enlarge a gap magnetic field.

In the case of the magnetic head described above, however, the main and return poles are located near the spin-torque oscillator. Further, the main and return poles are each formed of a continuous magnetic film. Therefore, magnetization of the main and return poles fluctuates due to a high-frequency magnetic field produced as the spin-torque oscillator oscillates, whereupon spin waves occur in the main and return poles. An energy loss due to the spin waves increases, so that oscillation of the spin-torque oscillator is suppressed. Consequently, the intensity of a high-frequency magnetic field for the magnetization reversal of a recording layer of a perpendicular recording medium becomes insufficient, so that it is sometimes difficult to achieve sufficient recording capability.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 3 is an exemplary enlarged sectional view showing a head section of the magnetic head;

FIG. 4 is an exemplary perspective view schematically showing a recording head and reproduction head;

FIG. 5 is an exemplary enlarged sectional view showing an end portion of the recording head on the side of a magnetic disk;

DETAILED DESCRIPTION

Various embodiments will be described hereinafter with reference to the accompanying drawings.

In general, according to one embodiment, a magnetic head comprises a main pole configured to apply a recording magnetic field to a recording layer of a recording medium; a return pole opposed to the main pole with a write gap therebetween; and a high-frequency oscillator between respective facing surfaces of the main pole and the return pole and configured to produce a high-frequency magnetic field. At least one of the main and return poles faces the high-frequency oscillator and comprises a laminated structure portion comprising a magnetic layer and a nonmagnetic layer laminated to one another.

First Embodiment

Figure 1:
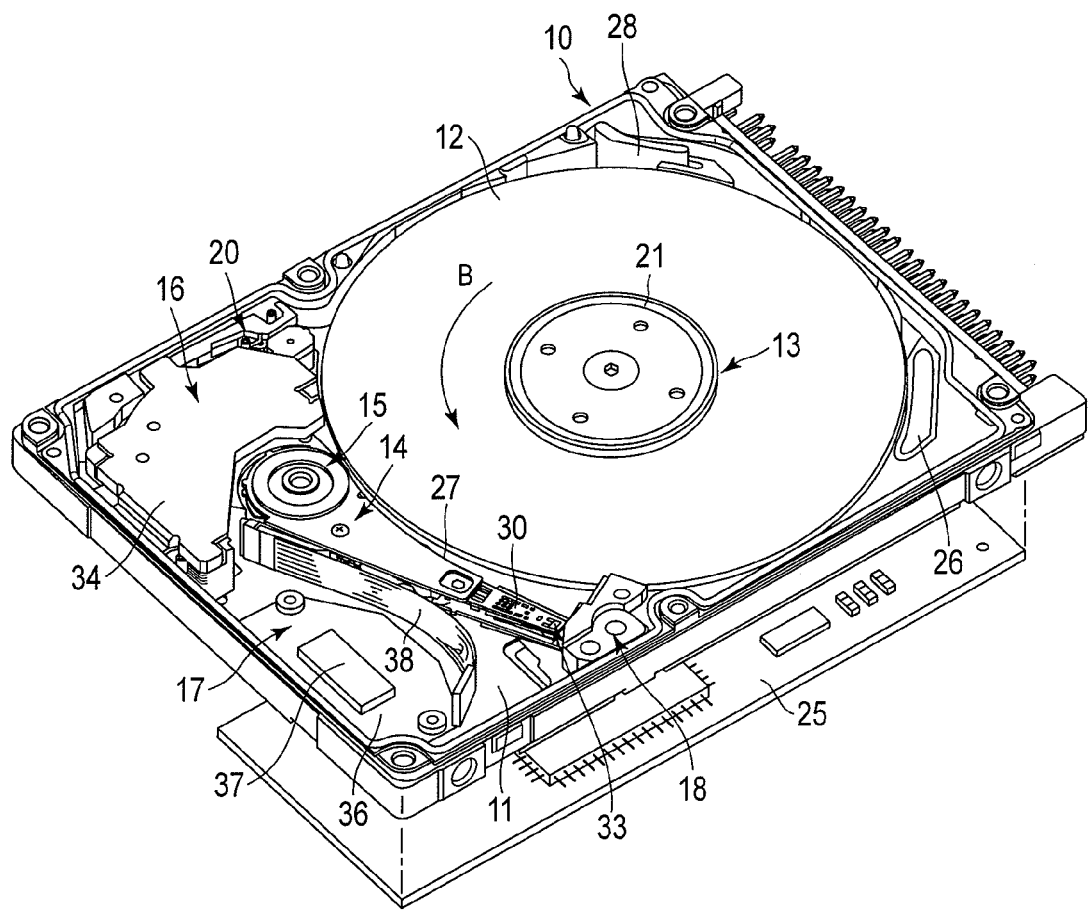
FIG. 1 is an exemplary perspective view showing a magnetic disk drive (HDD) according to a first embodiment.
Figure 2:
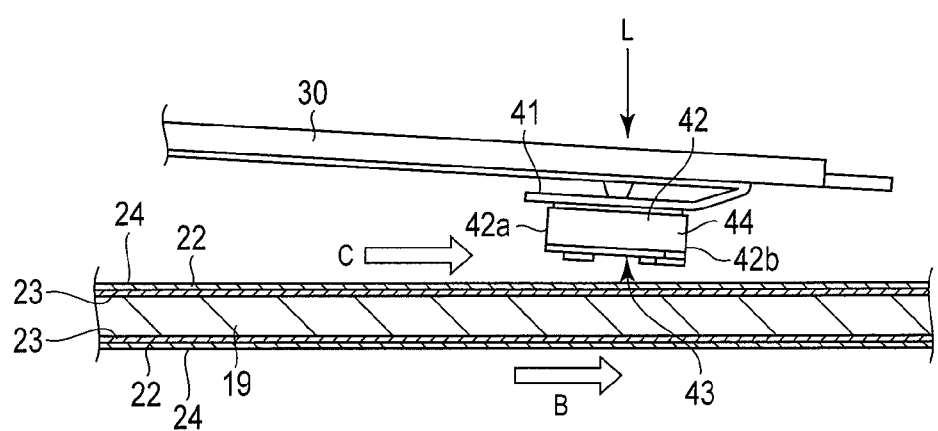
FIG. 2 is an exemplary side view showing a magnetic head and suspension of the HDD.

FIG. 1 shows the internal structure of a hard disk drive (HDD) as a disk drive according to a first embodiment with its top cover removed, and FIG. 2 shows a flying magnetic head. As shown in FIG. 1, the HDD comprises a housing 10. The housing 10 comprises a base 11 in the form of an open-topped rectangular box and a top cover (not shown) in the form of a rectangular plate. The top cover is attached to the base by screws such that it closes the top opening of the base. Thus, the housing 10 is kept airtight inside and can communicate with the outside through a breather filter 26 only.

The base 11 carries thereon a magnetic disk 12, for use as a recording medium, and a drive unit. The drive unit comprises a spindle motor 13, a plurality (e.g., two) of magnetic heads 33, head actuator 14, and voice coil motor (VCM) 16. The spindle motor 13 supports and rotates the magnetic disk 12. The magnetic heads 33 record data on and reproduce data from the disk 12. The head actuator 14 supports the heads 33 for movement relative to the surfaces of the disk 12. The VCM 16 pivots and positions the head actuator. The base 11 further carries a ramp loading mechanism 18, inertial latch 20, and board unit 17. The ramp loading mechanism 18 holds the magnetic heads 33 in a position off the magnetic disk 12 when the heads are moved to the outermost periphery of the disk. The inertial latch 20 holds the head actuator 14 in a retracted position if the HDD is jolted, for example. Electronic components, such as a preamplifier, head IC, etc., are mounted on the board unit 17.

A control circuit board 25 is attached to the outer surface of the base 11 by screws such that it faces a bottom wall of the base. The circuit board 25 controls the operations of the spindle motor 13, VCM 16, and magnetic heads 33 through the board unit 17.

As shown in FIGS. 1 and 2, the magnetic disk 12 is formed as a film medium for perpendicular magnetic recording. The disk 12 comprises a substrate 19 formed of a nonmagnetic disk with a diameter of, for example, about 2.5 inches. A soft magnetic layer 23 for use as an underlayer is formed on each surface of the substrate 19. The soft magnetic layer 23 is overlain by a perpendicular magnetic recording layer 22, which has a magnetic anisotropy perpendicular to the disk surface. A protective film 24 is formed on the recording layer 22.

As shown in FIG. 1, the magnetic disk 12 is coaxially fitted on the hub of the spindle motor 13 and clamped and secured to the hub by a clamp spring 21, which is attached to the upper end of the hub by screws. The disk 12 is rotated at a predetermined speed in the direction of arrow B by the spindle motor 13 for use as a drive motor.

The head actuator 14 comprises a bearing 15 secured to the bottom wall of the base 11 and a plurality of arms 27 extending from the bearing. The arms 27 are arranged parallel to the surfaces of the magnetic disk 12 and at predetermined intervals and extend in the same direction from the bearing 15. The head actuator 14 comprises elastically deformable suspensions 30 each in the form of an elongated plate. Each suspension 30 is formed of a plate spring, the proximal end of which is secured to the distal end of its corresponding arm 27 by spot welding or adhesive bonding and which extends from the arm. Each magnetic head 33 is supported on an extended end of its corresponding suspension 30 by a gimbal spring 41. Each suspension 30, gimbal spring 41, and magnetic head 33 constitute a head gimbal assembly. The head actuator 14 may comprise a so-called E-block in which a sleeve of the bearing 15 and a plurality of arms are formed integrally with one another.

As shown in FIG. 2, each magnetic head 33 comprises a substantially cuboid slider 42 and read/write head section 44 on an outflow end (trailing end) of the slider. A head load L directed to the surface of the magnetic disk 12 is applied to each head 33 by the elasticity of the suspension 30. The two arms 27 are arranged parallel to and spaced apart from each other, and the suspensions 30 and heads 33 mounted on these arms face one another with the magnetic disk 12 between them.

Each magnetic head 33 is electrically connected to a main FPC 38 (described later) through a relay flexible printed circuit (FPC) board 35 secured to the suspension 30 and arm 27.

As shown in FIG. 1, the board unit 17 comprises an FPC main body 36 formed of a flexible printed circuit board and the main FPC 38 extending from the FPC main body. The FPC main body 36 is secured to the bottom surface of the base 11. The electronic components, including a preamplifier 37 and head IC, are mounted on the FPC main body 36. An extended end of the main FPC 38 is connected to the head actuator 14 and also connected to each magnetic head 33 through each relay FPC 35.

The VCM 16 comprises a support frame (not shown) extending from the bearing 15 in the direction opposite to the arms 27 and a voice coil supported on the support frame. When the head actuator 14 is assembled to the base 11, the voice coil is located between a pair of yokes 34 that are secured to the base 11. Thus, the voice coil, along with the yokes and a magnet secured to one of the yokes, constitutes the VCM 16.

If the voice coil of the VCM 16 is energized with the magnetic disk 12 rotating, the head actuator 14 pivots, whereupon each magnetic head 33 is moved to and positioned on a desired track of the disk 12. As this is done, the head 33 is moved radially relative to the disk 12 between the inner and outer peripheral edges of the disk.

Figure 6:
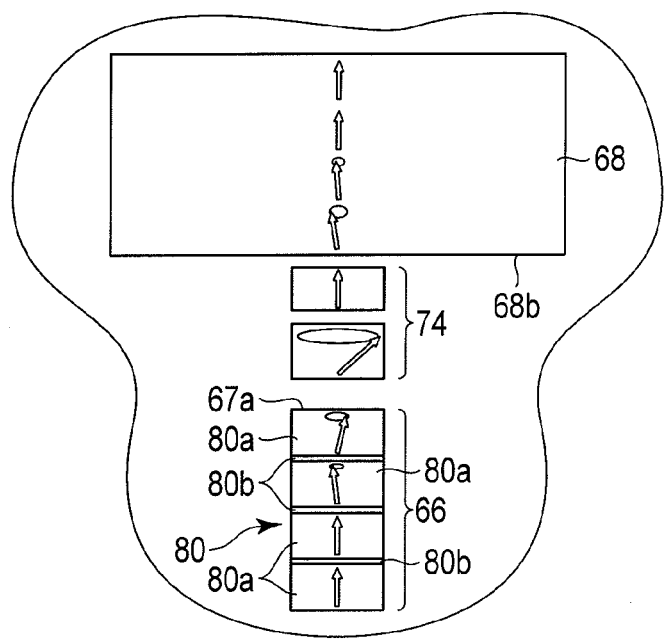
FIG. 6 is an exemplary deployment diagram of the recording head section taken from the ABS side of a slider.

The following is a detailed description of the configuration of each magnetic head 33. FIG. 3 is an enlarged sectional view showing the head section 44 of the head 33, and FIG. 4 is a perspective view schematically showing a recording head and reproduction head. FIG. 5 is an enlarged sectional view showing an end portion of the recording head on the magnetic-disk side, and FIG. 6 is a deployment diagram of the recording head section taken from the ABS side of the slider.

As shown in FIGS. 2 and 3, the magnetic head 33 is formed as a flying head, and comprises the substantially cuboid slider 42 and the head section 44 formed on the outflow or trailing end portion of the slider. The slider 42 is formed of, for example, a sintered body (AlTic) containing alumina and titanium carbide, and the head section 44 is a thin film.

The slider 42 has a rectangular disk-facing surface or air-bearing surface (ABS) 43 configured to face a surface of the magnetic disk 12. The slider 42 is kept flying at a predetermined height from the disk surface by airflow C that is produced between the disk surface and the ABS 43 as the disk 12 rotates. The direction of airflow C is coincident with the direction of rotation B of the disk 12. The slider 42 is disposed on the surface of the disk 12 in such a manner that the longitudinal direction of the ABS 43 is substantially coincident with the direction of airflow C.

The slider 42 comprises leading and trailing ends 42a and 42b on the inflow and outflow sides, respectively, of airflow C. The ABS 43 of the slider 42 is formed with leading and trailing steps, side steps, negative-pressure cavity, etc., which are not shown.

As shown in FIGS. 3 and 4, the head section 44 is formed as a dual-element magnetic head, comprising a reproduction head 54 and recording head 56 formed on the trailing end 42b of the slider 42 by thin-film processing.

The reproduction head 54 comprises a magnetic film 50 having a magnetoresistive effect and shield films 52a and 52b disposed on the trailing and leading sides, respectively, of the magnetic film such that they sandwich the magnetic film between them. The respective lower ends of the magnetic film 50 and shield films 52a and 52b are exposed in the ABS 43 of the slider 42.

The recording head 56 is located nearer to the trailing end 42b of the slider 42 than the reproduction head 54. The recording head 56 is constructed as a single-pole head comprising a return pole on the trailing end side.

The recording head 56 comprises a main pole 66, return pole (write/shield pole) 68, and recording coil 71. The main pole 66 consists mainly of a high-permeability material that produces a recording magnetic field perpendicular to the surfaces of the magnetic disk 12. The return pole 68 is disposed on the trailing side of the main pole 66 and serves to efficiently close a magnetic path with the aid of the soft magnetic layer 23 just below the main pole. The recording coil 71 is disposed such that it is wound around the magnetic path including the main and return poles 66 and 68 to pass magnetic flux to the main pole 66 while a signal is being written to the magnetic disk 12.

A power supply 70 is connected to the main and return poles 66 and 68, whereby a current circuit is constructed such that current from the power supply can be supplied in series through the poles 66 and 68.

As shown in FIGS. 3 to 6, the main pole 66 extends substantially perpendicular to the surfaces of the magnetic disk 12. A distal end portion 66a of the main pole 66 on the disk side is tapered toward the disk surface. The distal end portion 66a of the main pole 66 has, for example, a rectangular cross-section. The distal end surface of the main pole 66 is exposed in the ABS 43 of the slider 42. In the present embodiment, the width of the distal end portion 66a of the main pole 66 is substantially equal to the track width of the magnetic disk 12.

The return pole 68 is substantially U-shaped and its distal end portion 68a has an elongated rectangular shape. The distal end surface of the return pole 68 is exposed in the ABS 43 of the slider 42. A leading end surface 68b of the distal end portion 68a extends transversely relative to the track of the magnetic disk 12. The leading end surface 68b is opposed substantially parallel to a trailing end surface 67a of the main pole 66 with write gap WG therebetween.

The recording head 56 comprises a high-frequency oscillator, e.g., a spin-torque oscillator 74, disposed between the distal end portion 66a of the main pole 66 and the return pole 68. The spin-torque oscillator 74 is interposed between the trailing end surface 67a of the distal end portion 66a of the main pole 66 and the leading end surface 68b of the return pole 68 and arranged parallel to these end surfaces. The spin-torque oscillator 74 has its distal end exposed in the ABS 43 and is disposed flush with the distal end surface of the main pole 66 with respect to the surface of the magnetic disk 12. Under the control of the control circuit board 25, the spin-torque oscillator 74 is supplied with direct current along its film thickness as voltage from the power supply 70 is applied to the poles 66 and 68. By this current supply, the magnetization of the oscillator layer of the spin-torque oscillator 74 can be rotated to produce a high-frequency magnetic field. In this way, the high-frequency magnetic field is applied to the recording layer of the magnetic disk 12. Thus, the main and return poles 66 and 68 serve as electrodes for perpendicular energization of the spin-torque oscillator 74.

As shown in FIGS. 3 and 4, the return pole 68 comprises a junction 65 located near the upper part of the main pole 66 in a position off write gap WG, that is, the ABS of the slider. The junction 65 is connected to the main pole 66 through a back gap portion 67, which consists mainly of an insulator such as $SiO_2$. This insulator electrically insulates the main and return poles 66 and 68 from each other. Thus, by forming the back gap portion 67 based on the insulator, current from the power supply 70 can be efficiently applied to the spin-torque oscillator 74 through the main and return poles 66 and 68 that serve also as electrodes of the oscillator 74. $Al_2O_3$ may be used in place of $SiO_2$ as the insulator of the back gap portion 67.

The back gap portion 67 may also be formed using a semiconductor, such as silicon or germanium. The main and return poles 66 and 68, along with an electrical conductor, may be electrically connected to a part of the back gap portion 67 of the insulator or semiconductor. In this arrangement, electrostatic discharge occurs through the back gap portion 67 during processing operation, so that damage during the manufacture of the spin-torque oscillator 74 can be prevented, so that the yield can be improved. Further, sufficient current can be applied to the oscillator 74 by setting the electrical resistance of the back gap portion 67 as high as that of the oscillator 74.

As shown in FIGS. 3 to 6, the spin-torque oscillator 74 is formed by, for example, sequentially laminating a underlayer 74a, spin injection layer (second magnetic layer) 74b, 2-nm-thick copper interlayer 74c, oscillator layer (first magnetic layer) 74d, and cap layer 74e, from the side of the main pole 66 to the side of the return pole 68. The underlayer 74a is formed of a laminated layer of tantalum and ruthenium. The spin injection layer 74b is formed of a 20-nm-thick magnetic film of Co—Pt. The oscillator layer 74d is formed of a 13-nm-thick magnetic film of Fe—Co—Al. The cap layer 74e is formed of a laminated layer of copper and ruthenium. The underlayer 74a and cap layer 74e are connected to the main and return poles 66 and 68, respectively, which serve also as electrodes. Preferably, the trailing end surface 67a of the distal end portion 66a of the main pole 66 is longer than the spin-torque oscillator 74 along the track width.

The coercivity of the oscillator layer 74d is lower than that of a magnetic field applied from the main pole 66. Also, the coercivity of the spin injection layer 74b is lower than that of the magnetic field applied from the main pole 66.

The materials for the spin injection layer 74b and oscillator layer 74d, besides Co—Pt and Fe—Co—Al, may be soft magnetic layers having relatively high saturated magnetic flux density and magnetic anisotropy in the film in-plane direction, such as Co—Fe, Co—Ni—Fe, Ni—Fe, Co—Zr—Nb, Fe—N, Fe—Si, Fe—Al—Si, Fe—Co—Al, Fe—Co—Si, and Co—Fe—B, and Co—Cr-based magnetic alloy films whose magnetization is oriented in the film in-plane direction, such as Co—Ir.

Further, materials with high perpendicular orientation such that the magnetization is oriented perpendicular to the film plane may be used for the spin injection layer 74b and oscillator layer 74d. These materials include Co—Cr-based magnetic layers, such as Co—Cr—Pt, Co—Cr—Ta, Co—Cr—Ta—Pt, and Co—Cr—Ta—Nb; RE-TM-based amorphous alloy magnetic layers, such as Tb—Fe—Co; Co artificial lattice magnetic layers, such as Co/Pd, Co/Pt, Co/Ni, and Co—Cr—Ta/Pd; Co—Pt- or Fe—Pt-based alloy magnetic layers; Sm—Co-based alloy layers, etc. Furthermore, a laminated film comprising the above-described materials stacked in layers may be used to adjust saturation magnetization and an anisotropic magnetic field. If the laminated film is used, the saturated magnetic flux density (Bs) and anisotropic magnetic field (Hk) can be adjusted for the oscillator layer 74d and spin injection layer 74b.

For example, a 5- to 20-nm-thick film of a high-brass soft magnetic material (Fe—Co/Ni—Fe laminated film) can be used for the oscillator layer 74d. In this case, for example, a 2- to 60-nm-thick film of a Co—Pt alloy whose magnetization is oriented perpendicular to the film plane can be used for the spin injection layer 74b.

A nonmagnetic material with high spin permeability, such as copper, gold, or silver, can be used for the interlayer 74c. The film thickness of the interlayer 74c can be adjusted to one-atomic-layer thickness to about 3 nm. Thus, exchange couplings between the interlayer 74c and spin injection layer 74b can be reduced.

Preferably, the element size (size of a cross-section taken along a plane perpendicular to the direction of lamination) of the spin-torque oscillator 74 is adjusted to 10 to 100 nm square. The element shape is not limited to the cuboid shape and may alternatively be columnar or hexagonally prismatic. However, the element size is not limited to those values, and the materials and sizes of the oscillator layer 74d, spin injection layer 74b, and interlayer 74c are optionally selectable.

Although the spin injection layer 74b, interlayer 74c, and oscillator layer 74d are stacked in the order named, the oscillator layer, interlayer, and spin injection layer may alternatively be stacked in this order. In this case, the distance between the main pole 66 and oscillator layer 74d is reduced, so that a range in which a recording magnetic field produced by the main pole 66 and a high-frequency magnetic field produced by the oscillator layer are efficiently superposed is enlarged over the medium, thereby enabling satisfactory recording.

That part of the main pole 66 and/or return pole 68 which faces the spin-torque oscillator 74 constitutes a laminated structure portion in which magnetic and nonmagnetic layers are laminated to one another. In the present embodiment, that part of the distal end portion 66a of the main pole 66 which faces and contacts the spin-torque oscillator 74 constitutes a laminated structure portion 80 comprising magnetic and nonmagnetic layers laminated to one another. Specifically, the laminated structure portion 80 is formed by alternately laminating a plurality of magnetic layers 80a and a plurality of nonmagnetic layers 80b along the width of write gap WG. Thus, the magnetic and nonmagnetic layers 80a and 80b extend substantially perpendicular to the ABS 43 of the slider 42 and the surfaces of the magnetic disk 12.

Each magnetic layer 80a consists mainly of, for example, a 12-nm-thick Fe—Co alloy film with high saturated magnetic flux density, and each nonmagnetic layer 80b of a 0.5-nm tantalum film with good electrical conductivity.

Figure 7:
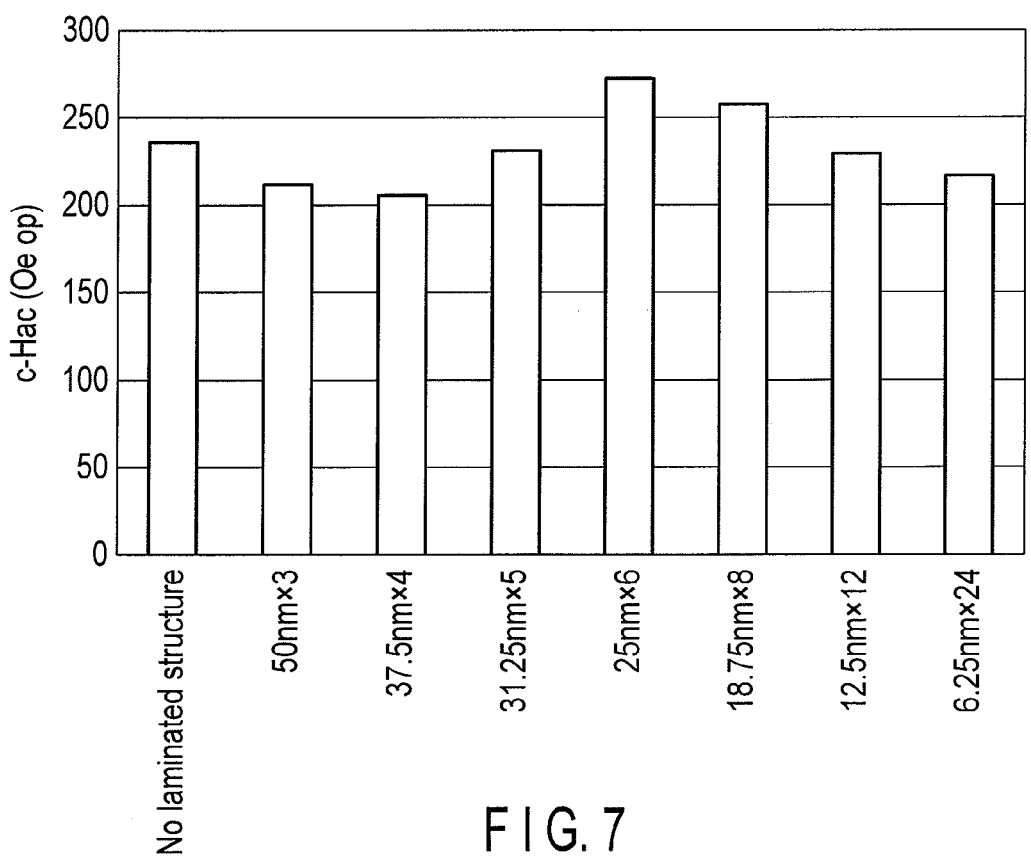
FIG. 7 is an exemplary diagram showing the relationship between the intensity of a circularly polarized high-frequency magnetic field (c-Hac) produced by a spin-torque oscillator and a laminated structure portion near the oscillator.

FIG. 7 shows the relationship between the intensity of a circularly polarized high-frequency magnetic field (c-Hac) produced by the spin-torque oscillator 74 and the laminated structure at the distal end portion 66a of the main pole near the oscillator 74. It is assumed that the oscillator layer 74d of the oscillator 74 is a 50-nm-long and 13-nm-thick Fe—Co—Al film, the distance from the center of the medium is 20 nm, and the applied current is at $2.8 \times 10^8$ A/cm$^2$. It is assumed, moreover, that the nonmagnetic layers 80b that constitute the laminated structure portion 80 have a uniform film thickness, and that the total film thickness of each set of the laminated magnetic and nonmagnetic layers 80a and 80b ranges from 6 to 50 nm. As seen from FIG. 7, the oscillator layer 74d oscillates best so that the highest radio-field intensity can be obtained when the total film thickness of each set of stacked layers is 25 nm.

As shown in FIG. 6, the magnetization of the main and return poles 66 and 68 is moved by the high-frequency magnetic field produced by the oscillator layer 74d of the spin-torque oscillator 74. Consequently, spin waves occur in the poles 66 and 68. An optimum wavelength of the spin waves depends on the oscillation frequency of the spin-torque oscillator 74. Since the main pole 66 comprises the laminated structure portion 80 comprising the magnetic and nonmagnetic layers 80a and 80b, however, the exchange-coupling force between the magnetic layers becomes zero, so that the main pole 66 is divided by the laminated structure portion 80. In consequence, the spin waves are excited depending on the film thickness of each magnetic layer 80a, not on the optimum wavelength of the spin waves, so that the amplitude of the spin waves is reduced. Thus, the energy loss of the main pole 66 due the spin waves is reduced. As a result, energy produced by spin torque is mainly consumed by the spin-torque oscillator 74, that is, the oscillation amplitude of the oscillator layer 74d increases. Accordingly, the intensity of the circularly polarized high-frequency magnetic field produced by the spin-torque oscillator 74 increases.

Figure 8:
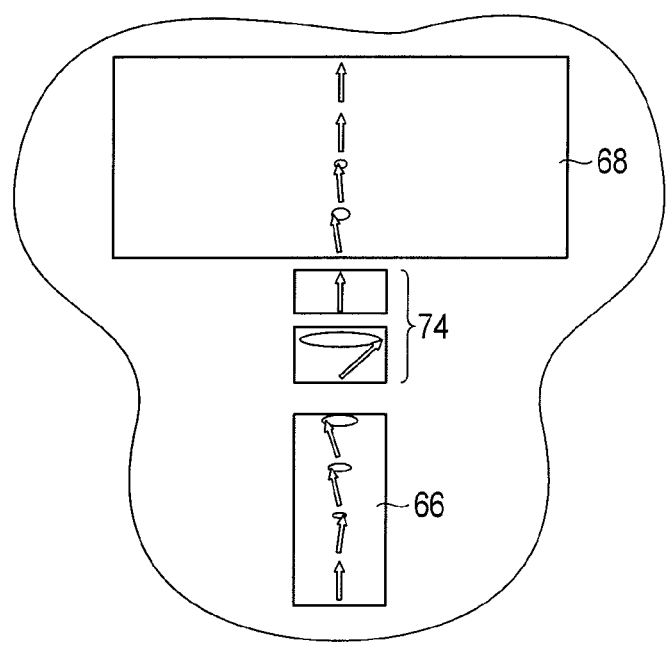
FIG. 8 is an exemplary deployment diagram of a recording head section according to a comparative example without a laminated structure portion taken from the ABS side of a slider.

FIG. 8 is a schematic plan view showing, as a comparative example, a recording head comprising a main pole 66 without a laminated structure portion, and illustrates magnetization behaviors of the main pole 66, spin-torque oscillator 74, and return pole 68 with respect to a flying surface. In this case, the spin waves with the optical wavelength can be excited depending on the oscillation frequency of the oscillator 74, and the amplitude of the spin waves increases. Thus, the energy loss of the main pole 66 due to the spin waves increases, whereupon the oscillation amplitude of the oscillator layer of the oscillator 74 is reduced, so that the intensity of the produced circularly polarized high-frequency magnetic field is reduced.

In consideration of substantial saturation of the main pole and the presence of vertically and horizontally magnetized surfaces during high-frequency assist recording, the wavelength (λ) of the spin waves excited by the main pole is expressed as follows:

$$\lambda \approx 2\sqrt{\pi\gamma \frac{A}{M_S}} \frac{1}{\sqrt{f_{STO}}} \sim 2\sqrt{\pi\gamma \frac{A}{M_S}} \frac{1}{\sqrt{\sqrt{f_{STO}^2 + (\gamma M_S)^2} - \gamma M_S}}$$

where A is an exchange-coupling constant; Ms, saturation magnetization; $f_{STO}$, frequency of the spin-torque oscillator (STO); and γ, gyro constant.

As the film thickness of the magnetic layers 80a becomes smaller and smaller than the half-wavelength (½λ) of the spin waves, the spin waves are gradually suppressed. The spin waves are most suppressed when the film thickness is equal to a half-integer multiple (½) of the half-wavelength, that is, to the quarter-wavelength (¼λ). Since double harmonics accompany basic spin waves, on the other hand, the effect of suppression is reduced to zero if the film thickness of the magnetic layers 80a becomes smaller than ⅛λ. Considering that the exchange-coupling constant A is proportional to the saturation magnetization Ms and the gyro constant γ is invariable, the film thickness (t) of each magnetic layer 80a is expected to satisfy the relationship given by $$\frac{1}{8} \frac{1.26 \times 10^{-4}}{\sqrt{\sqrt{\left(\frac{f_{STO}}{1.81 \times 10^7}\right)^2 + M_S^2} - M_S}} <$$

-continued $$t < \frac{1}{2} \frac{1.26 \times 10^{-4}}{\sqrt{\sqrt{\left(\frac{f_{STO}}{1.81 \times 10^7}\right)^2 + M_S^2} - M_S}}$$

where the units of the saturation magnetization Ms, frequency f, and film thickness t are emu/cc, Hz, and cm, respectively.

If the saturation magnetization Ms of 1,900 emu/cc and oscillation frequency f of 25 GHz are substituted into equation (2), the desired film thickness t of each magnetic layer 80a is 7 nm<t<30 nm. This agrees well with the result shown in FIG. 7.

Ruthenium, tungsten, copper, or rhenium is used as the material of the nonmagnetic layers 80b, and the film thickness of each layer 80b is preferably 1 nm or less. Thus, the exchange-coupling force between the adjacent magnetic layers 80a can be adjusted to antiferromagnetic coupling. In this case, a magnetic field applied to the adjacent magnetic layers 80a by magnetic loads produced on the surfaces of the magnetic layers and an exchange-coupling magnetic field produced by the exchange-coupling force cancel each other. Consequently, high radio-field intensity and hence excellent recording properties can be obtained.

Preferably, a material with good electrical conductivity, such as tantalum, gold, silver, aluminum, or magnesium, is used for the nonmagnetic layers 80b. If this is done, Joule heating near the spin-torque oscillator 74 can be suppressed, so that higher drive current can be applied to the oscillator 74. Thus, the oscillator 74 can be efficiently oscillated, so that high radio-field intensity can be achieved.

Those parts of the main pole 66 other than the laminated structure portion 80 may be of the same material as the magnetic layers at the laminated structure portion or of another material. For example, such a material as Fe—Co—Ta—C may be used for the magnetic layers 80a that constitute the laminated structure portion 80. With this material, Ta—C can be segregated between crystalline particles without changing the saturated magnetic flux density, so that the exchange coupling force between crystalline particles of Fe—Co can be reduced. Consequently, transmission of spin waves in the magnetic layers 80a and hence the amplitude of the spin waves can be suppressed. Thus, the spin-torque oscillator 74 can be efficiently oscillated, so that a satisfactory high-frequency magnetic field can be produced to obtain excellent recording properties.

If the VCM 16 is activated, according to the HDD constructed in this manner, the head actuator 14 pivots, whereupon each magnetic head 33 is moved to and positioned on a desired track of the magnetic disk 12. Further, the magnetic head 33 is caused to fly by airflow C that is produced between the disk surface and the ABS 43 as the disk 12 rotates. When the HDD is operating, the ABS 43 of the slider 42 is opposed to the disk surface with a gap therebetween. As shown in FIG. 2, the magnetic head 33 is caused to fly in such an inclined posture that the recording head 56 of the head section 44 is located closest to the surface of the disk 12. In this state, the reproduction head 54 reads recorded data from the disk 12, while the recording head 56 writes data to the disk.

In writing data, direct current is passed through the spin-torque oscillator 74 to produce a high-frequency magnetic field, which is applied to the perpendicular magnetic recording layer 22 of the magnetic disk 12. Further, the main pole 66 is excited by the recording coil 71. Data is recorded with a desired track width in such a manner that a perpendicular recording magnetic field is applied to the recording layer 22 of the magnetic disk 12 just below the main pole. Magnetic recording with high coercivity and high magnetically anisotropic energy can be achieved by superposing the high-frequency magnetic field on the recording magnetic field. Further, the laminated structure portion 80 of the main pole 66, comprising the magnetic and nonmagnetic layers, serves to suppress the energy loss of the main pole due to spin waves, thereby achieving sufficient recording capability and stable recording/reproducing properties. Thus, there may be obtained a magnetic head, capable of satisfactory recording with improved recording signal quality, and an HDD provided with the same.

The following is a description of magnetic heads of HDDs according to alternative embodiments. In the description of these alternative embodiments to follow, like reference numbers are used to designate the same parts as those of the first embodiment, and a detailed description thereof is omitted. Different parts will be mainly described in detail.

Second Embodiment

Figure 9:
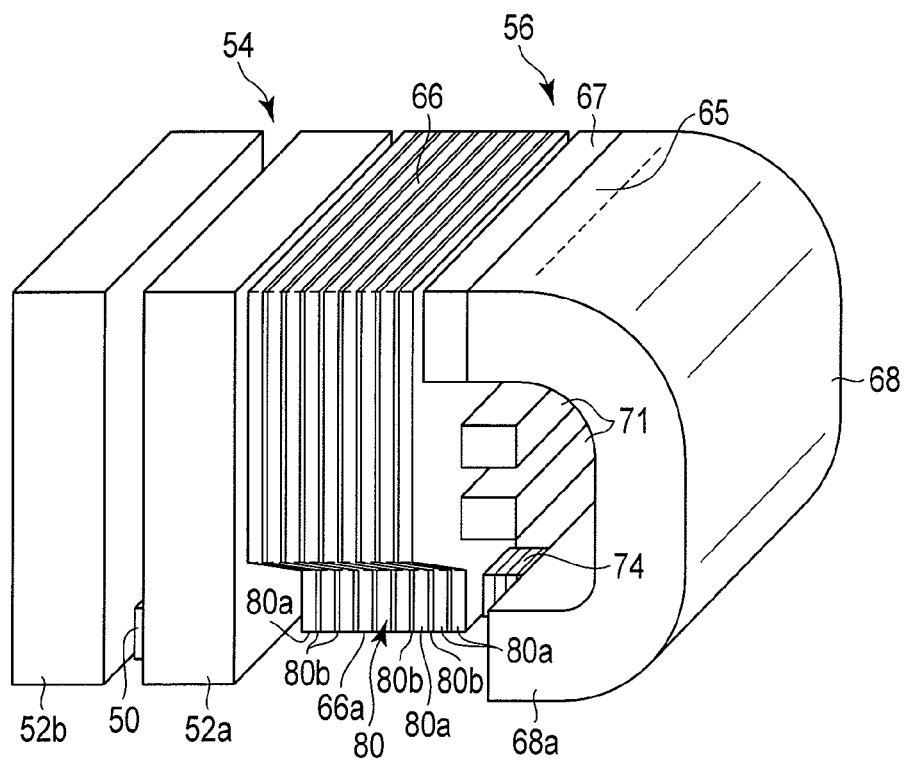
FIG. 9 is an exemplary perspective view schematically showing a recording head and reproduction head of a magnetic disk drive (HDD) according to a second embodiment.

FIG. 9 schematically shows a recording head of a magnetic head of an HDD according to a second embodiment. According to the present embodiment, a laminated structure portion 80 formed by alternately laminating magnetic layers 80a and nonmagnetic layers 80b spreads over the entire area of a main pole 66. Thus, the laminated structure portion 80 constitutes the entire main pole 66. The magnetic and nonmagnetic layers 80a and 80b are alternately laminated along the width of a write gap, and each of them extends substantially perpendicular to an ABS of a slider and the surfaces of a magnetic disk. Other configurations of the HDD and magnetic head are the same as those of the first embodiment.

According to a recording head 56 of the second embodiment constructed in this manner, the laminated structure portion 80 of the main pole 66, comprising the magnetic and nonmagnetic layers, serves to suppress the energy loss of the main pole due to spin waves, thereby achieving sufficient recording capability and stable recording/reproducing properties. Thus, there may be obtained a magnetic head, capable of satisfactory recording with improved recording signal quality, and an HDD provided with the same. Since the entire main pole 66 is formed of a laminated film comprising the magnetic and nonmagnetic layers 80a and 80b, moreover, a film forming process for the main pole 66 can be finished at a time, so that efficient processing operation can be achieved.

Third Embodiment

Figure 10:
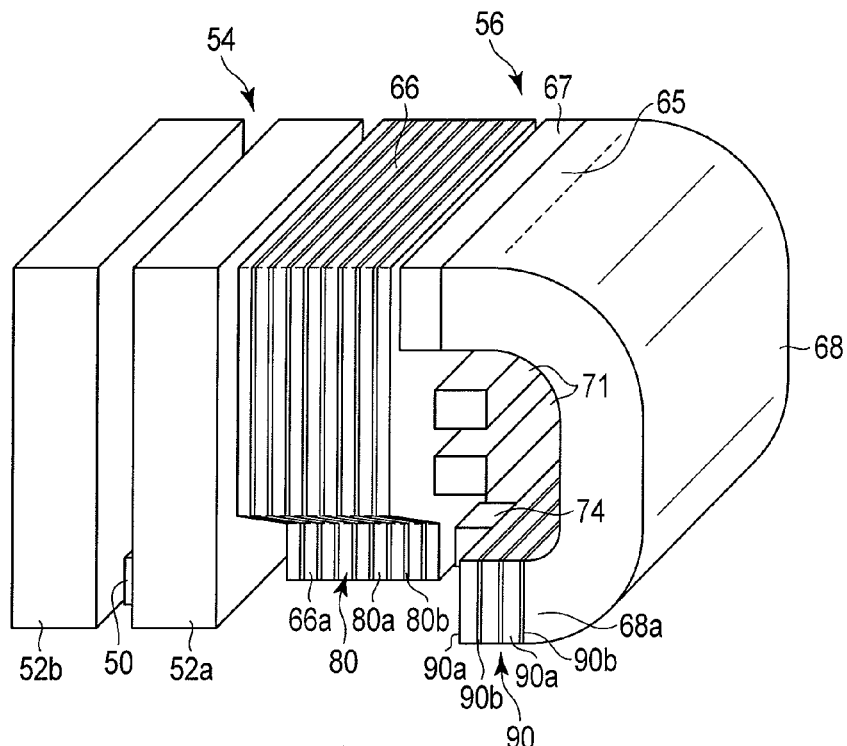
FIG. 10 is an exemplary perspective view schematically showing a recording head and reproduction head of a magnetic disk drive (HDD) according to a third embodiment.

FIG. 10 schematically shows a recording head of a magnetic head of an HDD according to a third embodiment. According to the third embodiment, as shown in FIG. 10, an entire main pole 66 is formed of a laminated structure portion 80 comprising magnetic layers 80a and nonmagnetic layers 80b laminated to one another, and a distal end portion 68a of a return pole 68 that faces and contacts a spin-torque oscillator 74 comprises a laminated structure portion 90 comprising magnetic layers 90a and nonmagnetic layers 90b.

The magnetic and nonmagnetic layers 90a and 90b of the laminated structure portion 90 are alternately laminated along the width of a write gap, and each of them extends substantially perpendicular to an ABS of a slider and the surfaces of a magnetic disk.

Figure 11:
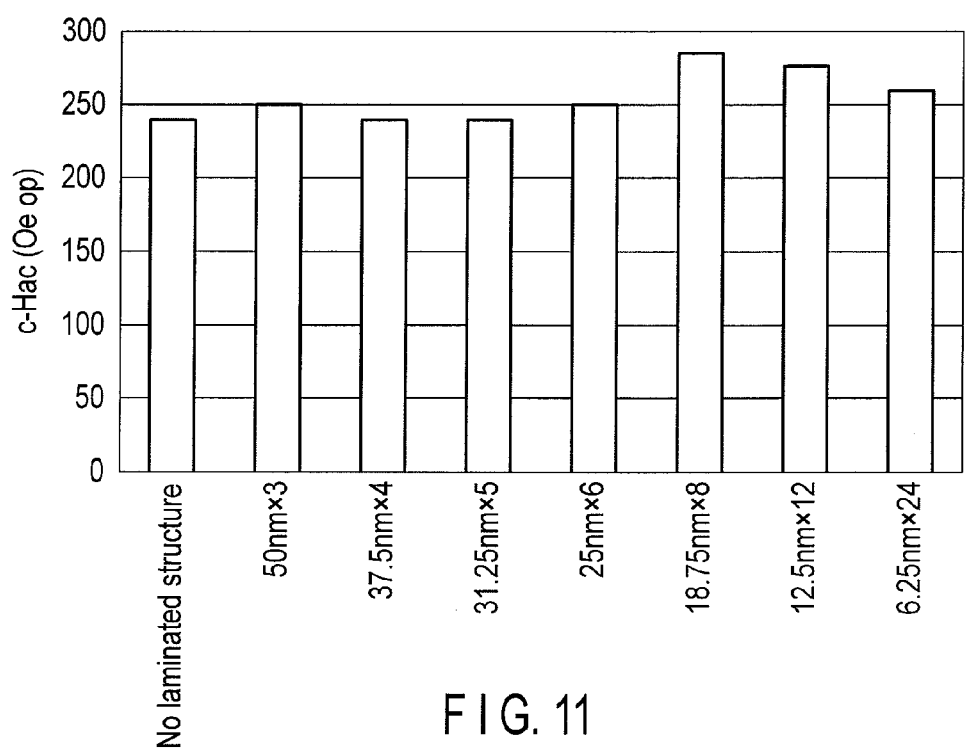
FIG. 11 is an exemplary diagram showing the relationship between the intensity of a circularly polarized high-frequency magnetic field (c-Hac) produced by a spin-torque oscillator according to the third embodiment and a laminated structure portion near the oscillator.

FIG. 11 shows the relationship between the intensity of the circularly polarized high-frequency magnetic field produced by the spin-torque oscillator 74 and the laminated structure portion 90 at the distal end portion of the return pole near the oscillator. It is assumed that an oscillator layer of the oscillator 74 is a 50-nm-long and 13-nm-thick Fe—Co—Al film, the distance from the center of the medium is 20 nm, and the applied current is at $2.8 \times 10^8$ A/cm$^2$. It is assumed, moreover, that the nonmagnetic layers 90*b* that constitute the laminated structure portion 90 of the return pole 68 have a uniform film thickness, and that the total film thickness of each set of the laminated magnetic and nonmagnetic layers 90*a* and 90*b* ranges from 6 to 50 nm. As seen from FIG. 11, the oscillator layer oscillates best so that the highest radio-field intensity can be obtained when the total film thickness of each set of stacked layers is 18.75 nm.

If the saturation magnetization Ms of the return pole 68 of 1,510 emu/cc and oscillation frequency f of 30 GHz are substituted into equation (2), the desired film thickness t is 23 nm>t>6 nm. This agrees well with the result shown in FIG. 11.

Other configurations of the HDD and magnetic head are the same as those of the first embodiment. Further, the structure, material, etc., of the laminated film comprising the magnetic and nonmagnetic layers 90*a* and 90*b* may be the same as those of the first embodiment.

According to the third embodiment arranged in this manner, the main and return poles 66 and 68 comprise their respective laminated structure portions each comprising the magnetic and nonmagnetic layers laminated to one another. When the spin-torque oscillator 74 oscillates, therefore, the oscillation amplitude of spin waves produced by the poles 66 and 68 can be suppressed. Thus, the energy loss of the poles 66 and 68 can be suppressed, so that magnetization of the oscillator layer can be efficiently oscillated. Consequently, high radio-field intensity and hence excellent recording properties can be obtained.

Fourth Embodiment

Figure 12:
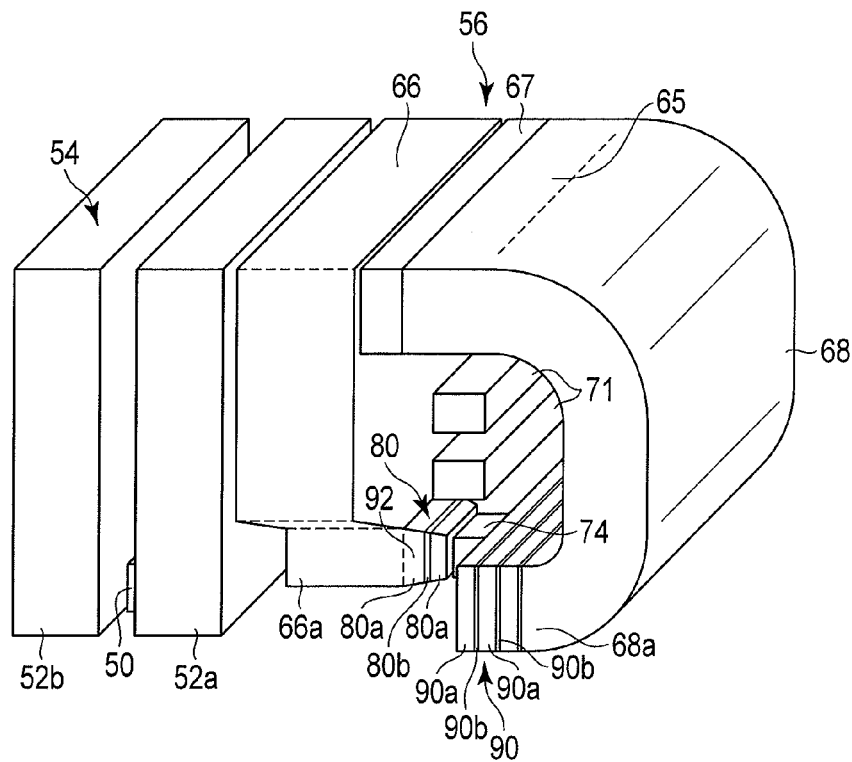
FIG. 12 is an exemplary perspective view schematically showing a recording head and reproduction head of a magnetic disk drive (HDD) according to a fourth embodiment.

FIG. 12 schematically shows a recording head of a magnetic head of an HDD according to a fourth embodiment. According to the fourth embodiment, a main pole 66 comprises a projection 92, which projects from a distal end portion 66*a* on the magnetic-disk side toward a return pole 68 and faces a distal end portion 68*a* of the return pole 68 with write gap WG therebetween. A spin-torque oscillator 74 is interposed between the projection 92 and the distal end portion 68*a* of the return pole 68.

The projection 92 comprises a laminated structure portion 80 comprising magnetic layers 80*a* and a nonmagnetic layer 80*b* laminated to one another. The magnetic and nonmagnetic layers 80*a* and 80*b* of the laminated structure portion 80 are alternately laminated along the width of a write gap, that is, in the projecting direction of the projection 92, and each of them extends substantially perpendicular to an ABS of a slider and the surfaces of a magnetic disk.

A laminated film that constitutes the laminated structure portion 80 has a laminated structure comprising an 11.7-nm-thick magnetic layer with saturation magnetization of 1,900 emu/cc and a 0.8-nm-thick nonmagnetic layer of ruthenium. Thus, the total film thickness is 12.5 nm. The nonmagnetic material, i.e., ruthenium, antiferromagnetically couples the magnetic layers 80*a* that individually contact the opposite sides of it.

Further, the distal end portion 68*a* of the return pole 68 that faces and contacts the spin-torque oscillator 74 comprises a laminated structure portion 90 comprising magnetic layers 90*a* and nonmagnetic layers 90*b* laminated to one another. The magnetic and nonmagnetic layers 90*a* and 90*b* of the laminated structure portion 90 are alternately laminated along the width of write gap WG, and each of them extends substantially perpendicular to the ABS of the slider and the surfaces of the magnetic disk.

Figure 13:
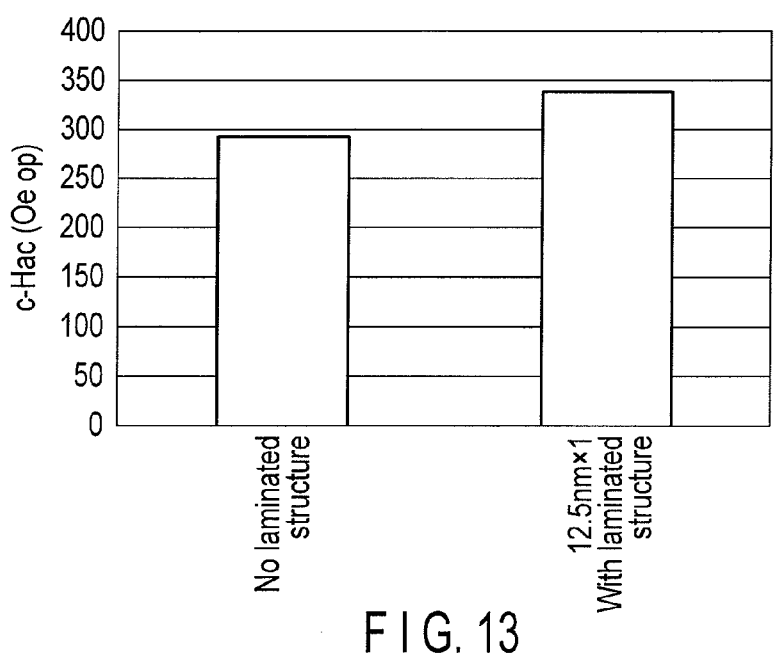
FIG. 13 is an exemplary diagram showing the relationship between the intensity of a circularly polarized high-frequency magnetic field (c-Hac) produced by a spin-torque oscillator according to the fourth embodiment and a laminated structure portion near the oscillator.

FIG. 13 shows the relationship between the intensity of a circularly polarized high-frequency magnetic field produced by the spin-torque oscillator 74 and the laminated structure at the distal end portion of the return pole near the oscillator. It is assumed that an oscillator layer of the oscillator 74 is a 50-nm-long and 13-nm-thick Fe—Co—Al film, the distance from the center of the medium is 20 nm, and the applied current is at $2.8 \times 10^8$ A/cm$^2$. With the laminated structure, as shown in FIG. 13, the oscillator layer oscillates better to provide higher radio-field intensity than without the laminated structure.

Thus, the projection 92 of the main pole 66 and the return pole 68 comprise their respective laminated structure portions each comprising the magnetic and nonmagnetic layers. When the spin-torque oscillator 74 oscillates, therefore, the oscillation amplitude of spin waves produced by the poles 66 and 68 can be suppressed. Thus, the energy loss of the poles 66 and 68 can be suppressed, so that magnetization of the oscillator layer can be efficiently oscillated. Consequently, high radio-field intensity and hence excellent recording properties can be obtained.

Although only the projection 92 of the main pole 66 is configured to comprise the laminated structure portion according to the present embodiment, other parts of the main pole may also be formed having a laminated structure portion. Further, tungsten, copper, or rhenium may be used in place of ruthenium as the material of the nonmagnetic layer, and the film thickness may be adjusted to 1 nm or less. In this arrangement, the magnetic layers on the opposite sides of the nonmagnetic layer are antiferromagnetically coupled. Consequently, the energy loss can be suppressed, so that high radio-field intensity and hence excellent recording properties can be obtained. Other configurations of the HDD and magnetic head are the same as those of the first embodiment. The structure, material, etc., of the laminated film comprising the magnetic and nonmagnetic layers may be the same as those of the first embodiment.

Fifth Embodiment

Figure 14:
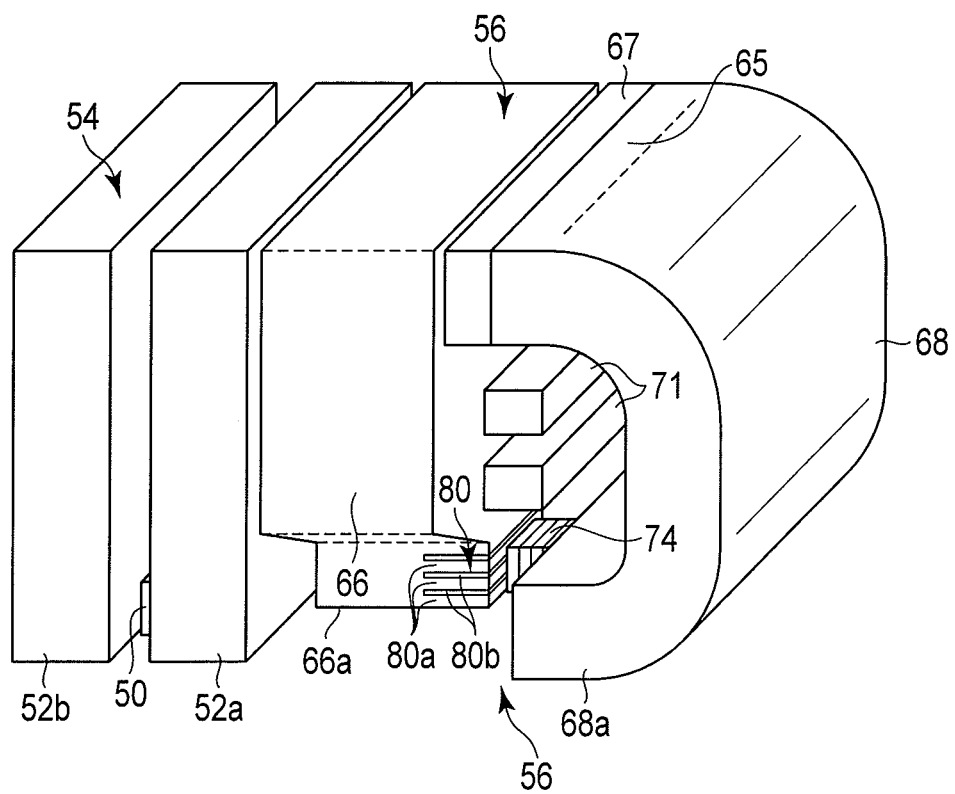
FIG. 14 is an exemplary perspective view schematically showing a recording head and reproduction head of a magnetic disk drive (HDD) according to a fifth embodiment.

FIG. 14 schematically shows a recording head of a magnetic head of an HDD according to a fifth embodiment. Those parts of a distal end portion 66*a* of a main pole 66 which faces and contacts a spin-torque oscillator 74 constitute a laminated structure portion 80 that comprises magnetic layers 80*a* and nonmagnetic layers 80*b* laminated to one another. In the present embodiment, the laminated structure portion 80 is formed by alternately laminating the magnetic and nonmagnetic layers 80*a* and 80*b* along the height of write gap WG, that is, substantially perpendicular to an ABS of a slider. Each of the magnetic and nonmagnetic layers 80*a* and 80*b* extends substantially parallel to the ABS of the slider.

Other configurations of the HDD and magnetic head are the same as those of the first embodiment. The structure, material, etc., of the laminated film comprising the magnetic and nonmagnetic layers may be the same as those of the first embodiment.

According to the fifth embodiment arranged in this manner, the main pole 66 comprises the laminated structure portion comprising the magnetic and nonmagnetic layers laminated to one another. When the spin-torque oscillator 74 oscillates, therefore, the oscillation amplitude of spin waves produced by the main pole 66 can be suppressed. Thus, the energy loss of the poles 66 and 68 can be suppressed, so that magnetization of the oscillator layer can be efficiently oscillated. Consequently, high radio-field intensity and hence excellent recording properties can be obtained. In the fifth embodiment, a laminated structure portion may also be provided on the side of the return pole 68.

According to the various embodiments described herein, there may be provided a magnetic head, capable of achieving sufficient recording capability and stable recording properties, a head gimbal assembly provided with the same, and a disk drive.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the high-frequency oscillator is not limited to the spin-torque oscillator and may be some other high-frequency generator, such as a wired generator. In the laminated structure portion, the numbers of nonmagnetic and nonmagnetic layers are not limited to the above-described embodiments and may be changed as required.

What is claimed is:

1. A magnetic head comprising:
a main pole configured to apply a recording magnetic field to a recording layer of a recording medium;
a return pole opposed to the main pole with a write gap therebetween; and
a high-frequency oscillator between respective facing surfaces of the main pole and the return pole, comprising an oscillator layer and a spin injection layer, and configured to produce a high-frequency magnetic field,
at least one of the main and return poles comprising a laminated structure portion, the laminated structure portion facing the high-frequency oscillator and comprising a magnetic layer and a nonmagnetic layer laminated to one another,
wherein a thickness of one magnetic layer in the laminated structure portion is greater than a thickness of the oscillator layer and is less than a total layer thickness of the oscillator layer and the spin injection layer.

2. The magnetic head of claim 1, wherein the coercivity of the oscillator layer is lower than that of a magnetic field applied from the main pole, and the coercivity of the spin injection layer is lower than that of the magnetic field applied from the main pole.

3. The magnetic head of claim 2, further comprising a current source configured to supply current to the high-frequency oscillator through the return pole and the main pole, wherein the return pole comprises a junction spaced apart from the write gap and connected to the main pole through an insulator or a semiconductor.

4. The magnetic head of claim 1, wherein the material of the nonmagnetic layers contains at least one of elements including ruthenium, tungsten, copper, rhenium, gold, silver, tantalum, aluminum, and magnesium.

5. The magnetic head of claim 1, wherein the film thickness of each of the nonmagnetic layers ranges from 0.2 to 1 nm.

6. The magnetic head of claim 1, wherein the main pole comprises a projection projecting toward the high-frequency oscillator, the projection constituting the laminated structure portion.

7. The magnetic head of claim 1, wherein the laminated structure portion constitutes the entire main pole.

8. The magnetic head of claim 1, wherein the magnetic layers and the nonmagnetic layers are alternately laminated along the width of the write gap at the laminated structure portion.

9. The magnetic head of claim 1, wherein the magnetic layers and the nonmagnetic layers are alternately laminated along the height of the write gap at the laminated structure portion.

10. A head gimbal assembly comprising:
a slider;
the magnetic head of claim 1 on the slider; and
a suspension configured to support the slider.

11. A disk drive comprising:
a disk recording medium comprising a recording layer having a magnetic anisotropy perpendicular to a surface of the medium;
a drive unit configured to support and rotate the recording medium; and
the magnetic head of claim 1 which processes data on the recording medium.

12. A magnetic head comprising:
a main pole configured to apply a recording magnetic field to a recording layer of a recording medium;
a return pole opposed to the main pole with a write gap therebetween; and
a high-frequency oscillator between respective facing surfaces of the main pole and the return pole, comprising an oscillator layer and a spin injection layer, and configured to produce a high-frequency magnetic field,
the main pole and the return pole each comprising a laminated structure portion, the laminated structure portion facing the high-frequency oscillator and comprising a magnetic layer and a nonmagnetic layer laminated to one another,
wherein a thickness of one magnetic layer in the laminated structure portion is greater than a thickness of one nonmagnetic layer in the laminated structure and is less than a total layer thickness of the oscillator layer and the spin injection layer.

13. The magnetic head of claim 12, wherein the coercivity of the oscillator layer is lower than that of a magnetic field applied from the main pole, and the coercivity of the spin injection layer is lower than that of the magnetic field applied from the main pole.

14. The magnetic head of claim 13, further comprising a current source configured to supply current to the high-frequency oscillator through the return pole and the main pole, wherein the return pole comprises a junction spaced apart from the write gap and connected to the main pole through an insulator or a semiconductor.

15. The magnetic head of claim 12, wherein the material of the nonmagnetic layers contains at least one of elements including ruthenium, tungsten, copper, rhenium, gold, silver, tantalum, aluminum, and magnesium.

16. The magnetic head of claim 12, wherein the film thickness of each of the nonmagnetic layers ranges from 0.2 to 1 nm.

17. The magnetic head of claim 12, wherein the magnetic layers and the nonmagnetic layers are alternately laminated along the width of the write gap at the laminated structure portion.

18. The magnetic head of claim 12, wherein the magnetic layers and the nonmagnetic layers are alternately laminated along the height of the write gap at the laminated structure portion.

* * * * *